United States Patent [19]
Cabrillat et al.

[11] Patent Number: 4,492,667
[45] Date of Patent: Jan. 8, 1985

[54] FAST NEUTRON NUCLEAR REACTOR

[75] Inventors: Marie-Thérèse Cabrillat, Pertuis; Noël Lions, Manosque, both of France

[73] Assignee: Commissariat a l'Energie Atomique, Paris, France

[21] Appl. No.: 381,894

[22] Filed: May 25, 1982

[30] Foreign Application Priority Data

May 27, 1981 [FR] France ................................ 81 10565

[51] Int. Cl.³ .............................................. G21C 15/00
[52] U.S. Cl. ................................... 376/405; 376/203; 376/290; 376/291
[58] Field of Search ............... 376/404, 405, 290, 203, 376/291, 171

[56] References Cited

U.S. PATENT DOCUMENTS

| | | | |
|---|---|---|---|
| 3,498,880 | 3/1970 | Gallion | 376/405 |
| 3,525,669 | 8/1970 | Germer . | |
| 3,784,443 | 1/1974 | Vercasson | 376/405 |
| 4,022,656 | 5/1977 | Durston et al. | 376/290 |
| 4,043,866 | 8/1977 | Durston | 376/405 |
| 4,087,325 | 5/1978 | Chevallier et al. | 376/290 |
| 4,351,794 | 9/1982 | Artaud et al. | 376/405 |
| 4,366,854 | 1/1983 | Artaud et al. | 376/405 |

FOREIGN PATENT DOCUMENTS

| | | |
|---|---|---|
| 1525183 | 5/1968 | France . |
| 2326011 | 4/1977 | France . |
| 2346816 | 10/1977 | France . |

Primary Examiner—Harvey E. Behrend
Attorney, Agent, or Firm—Dennis P. Clarke

[57] ABSTRACT

The invention relates to a fast neutron nuclear reactor of the integrated type comprising a cylindrical inner vessel.

The inner vessel comprises two concentric ferrules and the connection between the hot collector defined within this vessel and the inlet port of the exchangers is brought about by a hot structure forming a heat baffle and supported by the inner ferrule and by a cold structure surrounding the hot structure, supported by the outer ferrule and sealingly connected to the exchanger.

Application to the generation of electric power in nuclear power stations.

4 Claims, 3 Drawing Figures

FAST NEUTRON NUCLEAR REACTOR

BACKGROUND OF THE INVENTION

The invention relates to a fast neutron nuclear reactor of integrated type, i.e. in which the complete primary circuit of the reactor is contained in a vertically axed vessel, called the main vessel and whose upper part is sealed by a slab. More specifically the invention relates to a reactor in which the "hot" liquid metal (generally sodium) leaving the reactor core is separated from the "cold" liquid metal leaving the exchangers by an internal cylindrical vessel.

In fast neutron reactors, the liquid metal is heated during its passage in the core as a result of the fission reaction taking place within the latter. The heat stored in the liquid metal contained in the primary circuit is then transferred to the liquid metal (generally sodium) contained in a secondary circuit by intermediate heat exchangers. The primary liquid metal is then taken up again by the primary pumps to be reinjected into the core.

In reactors of the integrated type, the exchangers and pumps are suspended on the slab sealing the main vessel of the reactor. Moreover, in reactors with an internal cylindrical vessel, the exchangers and pumps are located in the annular space defined between the inner vessel and the main vessel. Throughout the remainder of the text the zone defined within the inner vessel and containing the liquid metal leaving the reactor core is called the "hot" collector and the zone containing the liquid metal leaving the exchangers and which has not yet entered the reactor core is called the "cold" collector.

Compared with fast neutron reactors in which the cold collector is separated from the hot collector by a stepped inner vessel traversing the exchangers and the pumps, reactors with a cylindrical inner vessel have the advantage of reduced overall dimensions with respect to the diameter of the reactor block.

However, in fast neutron reactors with an inner cylindrical vessel there are a certain number of problems related to the connection between the inner vessel and the exchangers. Thus, the pipes and ferrules bringing about this connection support both the mechanical loads resulting from their own weight, the hydrostatic pressure forces resulting from the tight connection with has to be provided between these structures and the wall of the exchanger in order to effectively insulate the hot collector from the cold collector, the thermal stresses due to the temperature differences of the liquid metal between the collectors and the stresses linked with the hydraulic function played by these structues for the supply of the exchangers. It is obvious that the accumulation of all these stresses on one and the same structure makes its construction extremely difficult, especially in view of the fact that there must be no risk of it failing.

BRIEF SUMMARY OF THE INVENTION

The present invention relates to a fast neutron nuclear reactor of the integrated type incorporating a cylindrical inner vessel, whose structures ensuring the connection between the inner vessel and the exchangers do not have the disadvantages of the same type of reactors according to the prior art. More specifically the invention relates to a reactor in which the connecting structures between the inner vessel and the exchangers comprise two separate parts which respectively fulfil in a clearly separated manner the function of hydraulic baffle for the parts in contact with the hot liquid metal and the sealing function for the cold parts, which thus support the mechanical and hydrostatic loads.

The present invention therefore relates to a fast neutron nuclear reactor comprising a vertically axed main vessel sealed in its upper part by a slab and containing the core of the reactor and a volume of liquid cooling metal for the latter, an inner cylindrical vessel defining within the main vessel a hot collector overhanging the core and a cold annular collector, at least one heat exchanger and at least one primary pump suspended on the slab and disposed in the cold collector for respectively ensuring the cooling of the liquid metal contained in the hot collector and its circulation between the hot and cold collectors, and connecting means making it possible to pass the liquid metal contained in the hot collector up to an inlet port of the exchanger, the inner vessel incorporating an inner cylindrical ferrule and an outer cylindrical ferrule arranged in a coaxial manner, the connecting means comprising a cold outer structure supported by the outer ferrule and comprising a first ferrule which is concentric to the exchanger and whose lower end is connected thereto by a tight connection below the inlet port, and a hot inner structure supported by the inner ferrule and comprising a second ferrule concentric to the exchanger and placed within the first ferrule, wherein the first ferrule is open at its upper end above the free level of the liquid metal contained in the main vessel and wherein the second ferrule is open at its two ends located respectively above the free level of the liquid metal contained in the vessel and below the inlet port of the exchanger, in such a way that the hot inner structure and the cold outer structure are undependent of one another, the hot inner structure passing the liquid metal contained in the hot collector to the inlet port of the exchanger and forming a heat baffle, whilst the cold outer structure ensures sealing between the hot collector and the cold collector.

As a result of these features it is possible to clearly separate the functions between the cold structures having a sealing function and the hot structures having a thermohydraulic baffle function. Thus, the greatest mechanical and hydrostatic loads are supported by the cold structures, which are not subject to creep and whose reinforced parts submerged in the cold collector are not directly exposed to fatigue.

According to a preferred embodiment of the invention the cold outer structure also comprises an outer pipe, whose two ends are respectively connected to the outer ferrule of the inner vessel and to the first ferrule, and the hot inner structure also comprises an inner pipe placed within the outer pipe and whose two ends are respectively connected to the inner ferrule of the inner vessel and to the second ferrule.

According to another feature of this preferred embodiment of the invention the tight connection between the first ferrule and the exchanger incorporates an argon bell system having a lower part and an upper part respectively supported by the first ferrule and the exchanger.

In view of the fact that the lower orifice of the second ferrule is not tight, there is a danger of liquid metal circulating between the inner and outer ferrules constituting the inner vessel when several exchangers are simultaneously sealed. In order to obviate this disadvantage, the reactor also comprises a valve which is able to seal the inlet port of the exchanger, said valve incorporating a joint which sealingly engages that part of the second ferrule located below the part when the valve is closed.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
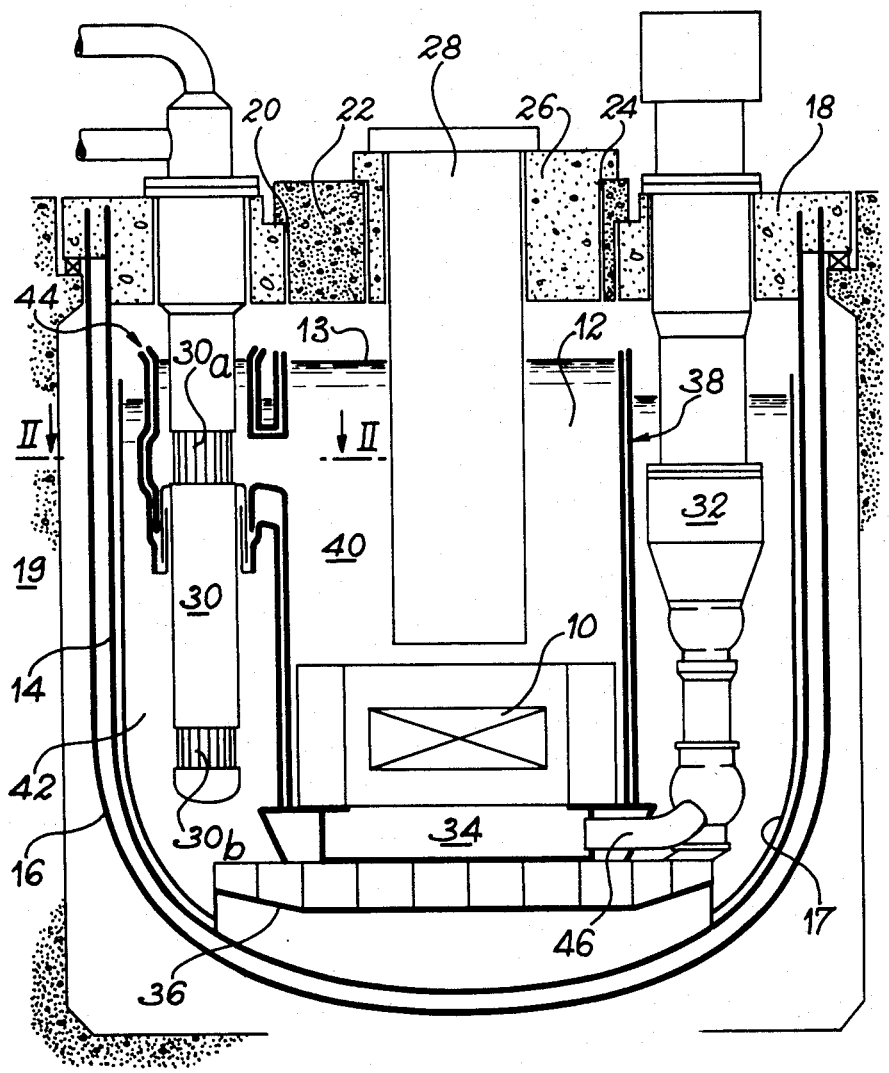
FIG. 1 a cross-sectional diagrammatic view of a fast neutron nuclear reactor according to the invention.

FIG. 1 diagrammatically shows an integrated fast neutron nuclear reactor. The reactor core 10 is submerged in a volume 12 of a cold liquid metal (generally sodium) contained within a vertically axed vessel 14, called the main vessel. The main vessel 14 is externally duplicated by a second vessel 16, called the safety vessel. In addition, in the represented variant, it is internally duplicated by a heat baffle 17. The upper open ends of vessels 14 and 16 are embedded in a horizontal sealing slab 18 resting by a peripheral shoulder on a bearing edge provided in a vessel shaft 19 defining the installation.

In known manner slab 18 has in its centre an opening 20 which receives a large rotary plug 22 having an orifice 24, which is off-centred with respect to opening 20 and receives a small rotary plug 26 carrying the core cover 28. The combined rotation of rotary plugs 22, 26 permits, by means of a not shown handling system, the loading and unloading of fuel assemblies with respect to reactor core 10. The core cover 28 in per se known manner contains measuring and control instruments relative to the core.

Figure 2:
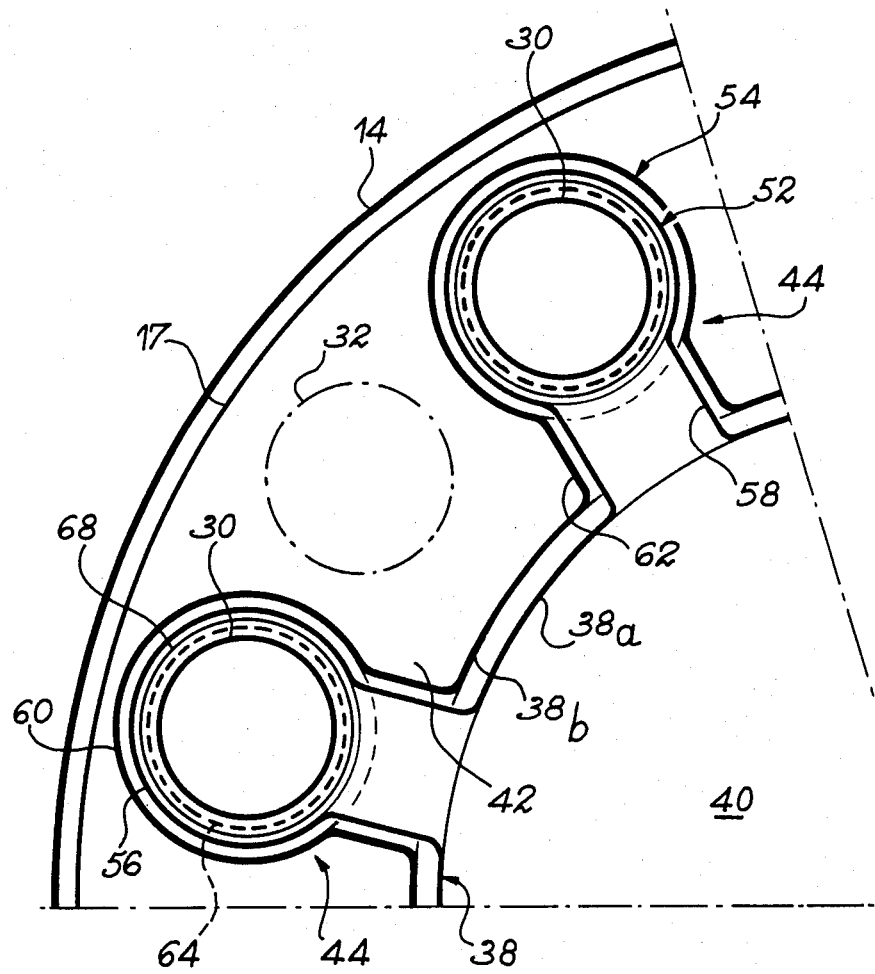
FIG. 2 a larger scale view in section along the line II—II of FIG. 1 diagrammatically showing the structure enabling the connection of the cylindrical inner vessel to the inlet ports of the exchangers.

In its peripheral area surrounding the rotary plugs, slab 18 supports intermediate heat exchangers 30 and pumps 32, which are regularly distributed and arranged in alternating manner, as shown in FIG. 2.

Reactor core 10 shown in FIG. 1 is supported and supplied with liquid metal by as support 34, which is itself mounted on a flooring 36 resting on the bottom of the main vessel 14. Support 34 also supports an inner cylindrical vessel 38, whose vertical axis coincides with that of vessels 14 and 16. Inner vessel 38 surrounds the reactor core 10 and rises above the free level 13 of liquid metal 12 to define above the core a hot colleetior 40 and between inner vessel 38 and main vessel 14 a cold collector 42. A connection, designated in general manner by reference numeral 44, is provided between inner vessel 38 and each of the exchangers 30 in order to bring the liquid metal within the hot collector 40 up to an inlet port 30a formed in these exchangers. Each of the exchangers also has an outlet port 30b issuing into cold collector 42 and the liquid metal transferred into the latter by the exchangers is taken up by pumps 32 and reinjected into support 34 by pipes 46.

Figure 3:
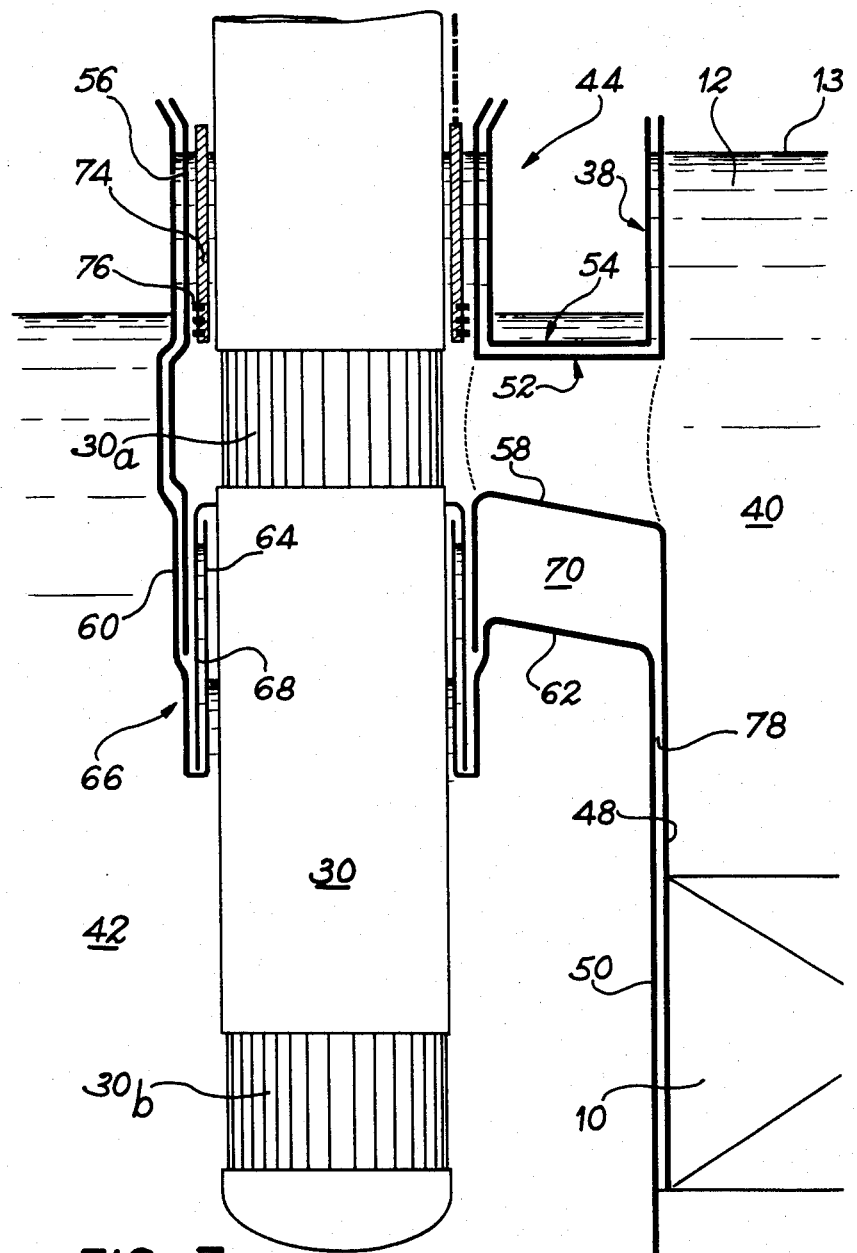
FIG. 3 a cross-sectional diagrammatic view comparable to FIG. 1 showing on a larger scale the inner vessel and the structures connecting the latter to one of the exchangers according to a variant of the invention.

According to the invention and as is more particularly illustrated in FIGS. 2 and 3, inner vessel 38 comprises two coaxial ferrules, which are perfectly cylindrical and define an inner ferrule 48 and an outer ferrule 50. Moreover, each of the connecting means 44 comprises a hot inner structure 52 connected to the inner ferrule 48 and a cold outer structure 54 connected to the outer ferrule 50. Inner structure 52 is in contact with the liquid metal leaving hot collector 40. It comprises a ferrule 56 concentric to exchanger 30 and open at its two ends, as well as a pipe 58 linking the hot collector 40 with the interior of ferrule 56. It can be seen in FIG. 3 that the upper end of ferrule 56 is located above the free level of the hot liquid metal contained in said vessel and that the lower end of ferrule 56 is extended below the inlet port 30a of the exchanger, without being sealingly connected to the latter. Moreover, pipe 58 is in the form of a coffee pot spout and is level with port 30a.

In a comparable manner, the outer structure 54 is in contact with the liquid metal contained in the cold collector 42. This structure 54 also comprises a ferrule 60 concentric to exchanger 30 and positioned within ferrule 56 and a pipe 62 connecting outer ferrule 50 to ferrule 60. Like ferrule 56, ferrule 60 is open in its upper part and its upper end is placed at the same level, i.e. above the free level of the liquid metal contained in hot collector 40. The lower end of ferrule 60 passes below the lower end of ferrule 56 and supports the lower part 64 of a per se known argon bell sealing system 66. The upper part 68 of sealing system 66 is fixed to the outer wall of exchanger 30 below inlet port 30a.

Like pipe 52, pipe 54 is shaped like a coffee pot spout. Moreover, and as shown in FIG. 3, the lower part of pipe 62 is spaced from the lower part of pipe 58, the latter being substantially level with the lower edge of port 30a, whereas the lower part of pipe 62 is slightly above the lower end of ferrule 56. Thus, a chamber 70 is defined between pipes 58 and 62.

Exchanger 30 is equipped with a tubular valve 74 normally positioned above the inlet port 30a, as shown in FIG. 3, and whose height is sufficient to completely seal port 30a when it faces the latter. In the embodiment shown in the drawing, valve 74 carries on its outer face and at its lower end segment joints 76 serving to tightly seal the passage formed between the lower part of inner ferrule 56 and part 68 of joint 66. This feature obviates any sodium circulation in chamber 70 and the space 78 separating ferrules 48 and 50 when several exchangers 30 are sealed.

In conclusion, in the constructional variant of the invention described hereinbefore, the inner cylindrical vessel 38 is characterized in that it comprises two perfectly cylindrical concentric ferrules, which therefore have a particularly simple construction. Furthermore, the connecting means connecting the inner vessel to each of the exchangers comprise a cold outer structure 54 supported by the outer ferrule 50 and sealingly connected to the exchanger by system 66 and a hot inner structure serving as a heat baffle, whilst ensuring the passage of the liquid metal contained in the hot collector towards the inlet port of the exchanger. In other words, the cold structure 54 ensures the seal between the hot collector and the cold collector and is subject to the action of the hydrostatic pressure forces and its own weight. In turn, hot structure 52 haas a thermal and hydraulic function for the supply of the exchangers. Moreover, the fact that the lower part of the inner ferrule 56 is not tight makes it possible to eliminate hydrostatic pressure forces.

Therefore the sealing and thermohydraulic functions are clearly separated because only cold structure 54 has a sealing function, whereas the inner structure 52 serves as a thermohydraulic baffle. Thus, the greatest mechanical and hydrostatic stresses and loads are supported by the cold structure, which are not subject to creep and whose parts submerged in the cold collector 42 are not directly exposed to fatigue.

We claim:

1. A fast neutron nuclear reactor comprising a vertically axed main vessel sealed in its upper part by a slab and containing the core of the reactor and a volume of liquid cooling metal for the latter, an inner cylindrical vessel defining within the main vessel a hot collector overhanging the core and a cold annular collector, at least one heat exchanger and at least one primary pump suspended on the slab and disposed in the cold collector for respectively ensuring the cooling of the liquid metal contained in the hot collector and its circulation between the hot and cold collectors, and connecting means making it possible to pass the liquid metal contained in the hot collector up to an inlet port of the exchanger, the inner vessel incorporating an inner cylindrical ferrule and an outer cylindrical ferrule arranged in a coaxial manner, the connecting means comprising a cold outer structure supported by the outer ferrule and comprising a first ferrule which is concentric to the exchanger and whose lower end is sealingly connected thereto below the inlet port, and a hot inner structure supported by the inner ferrule and comprising a second ferrule concentric to the exchanger and placed within the first ferrule, wherein the first ferrule is open at its upper end above the free level of the liquid metal contained in the main vessel and wherein the second ferrule is open at its two ends located respectively above the free level of the liquid metal contained in the vessel and below the inlet port of the exchanger, and wherein the hot inner structure, the cold outer structure and the heat exchanger are spaced apart from one another, the hot inner structure passing the liquid metal contained in the hot collector to the inlet port of the exchanger and forming a heat baffle, whereas the cold outer structure ensures sealing between the hot collector and the cold collector.

2. A nuclear reactor according to claim 1, wherein the cold outer structure also comprises an outer pipe, whose two ends are respectively connected to the outer ferrule of the inner vessel and to the first ferrule, and the hot inner structure also comprises an inner pipe placed within the outer pipe and whose two ends are respectively connected to the inner ferrule of the inner vessel and to the second ferrule.

3. A nuclear reactor according to claims 1 or 2, wherein the first ferrule and the exchanger are sealingly connected by an argon bell system having a lower part and an upper part respectively supported by the first ferrule and the exchanger.

4. A nuclear reactor according to claims 1 or 2, wherein it also comprises a valve which can seal the inlet port of the exchanger, said valve incorporating joints sealingly engaging that part of the second ferrule located below the port when the valve is closed.

* * * * *